(12) United States Patent
Liesener

(10) Patent No.: US 7,674,025 B2
(45) Date of Patent: Mar. 9, 2010

(54) EXTERIOR REARVIEW MIRROR FOR VEHICLES, PREFERABLY FOR MOTOR VEHICLES

(75) Inventor: Alf Liesener, Schorndorf (DE)

(73) Assignee: SMR Patents S.a.r.l., Luxembourg (LU)

( * ) Notice: Subject to any disclaimer, the term of this patent is extended or adjusted under 35 U.S.C. 154(b) by 146 days.

(21) Appl. No.: 11/867,983

(22) Filed: Oct. 5, 2007

(65) Prior Publication Data

US 2008/0112176 A1 May 15, 2008

(30) Foreign Application Priority Data

Oct. 6, 2006 (DE) .................... 10 2006 048 323

(51) Int. Cl.
*B60Q 1/26* (2006.01)
(52) U.S. Cl. ............... 362/494; 362/487; 362/498; 362/509; 362/540; 362/546
(58) Field of Classification Search ........... 362/487, 362/494, 498, 509, 540, 546
See application file for complete search history.

(56) References Cited

U.S. PATENT DOCUMENTS

2005/0047160 A1 * 3/2005 Evans .................... 362/494

2005/0276057 A1 12/2005 Takahashi et al.

FOREIGN PATENT DOCUMENTS

CA 2561 529 A1 10/2005

* cited by examiner

*Primary Examiner*—Sandra L O'Shea
*Assistant Examiner*—Meghan K Dunwiddie
(74) *Attorney, Agent, or Firm*—Reising Ethington P.C.

(57) ABSTRACT

The exterior rearview mirror has a mirror head, which is provided with a mirror glass and with at least one illuminant, which radiates light through at least one light permeable section to the exterior. Furthermore, the exterior rearview mirror has a mirror base. In order to provide the exterior rearview mirror, so that the light function is performed in an optimum manner through the simple provision of the mirror, at least part of the housing of the mirror head and/or of the mirror base is comprised of at least two plastic layers, having different light permeability. In the light permeable section, the plastic layer with the lower light permeability is missing, or it only has such thickness, that the light emitted by the illuminant radiates to the exterior with sufficient light intensity. The plastic layer with higher light permeability can be used as a light pane for the illuminant disposed behind it. The plastic layer with lower light permeability can be provided to provide the transparent section with a proper color.

9 Claims, 4 Drawing Sheets

Figures 1, 2:
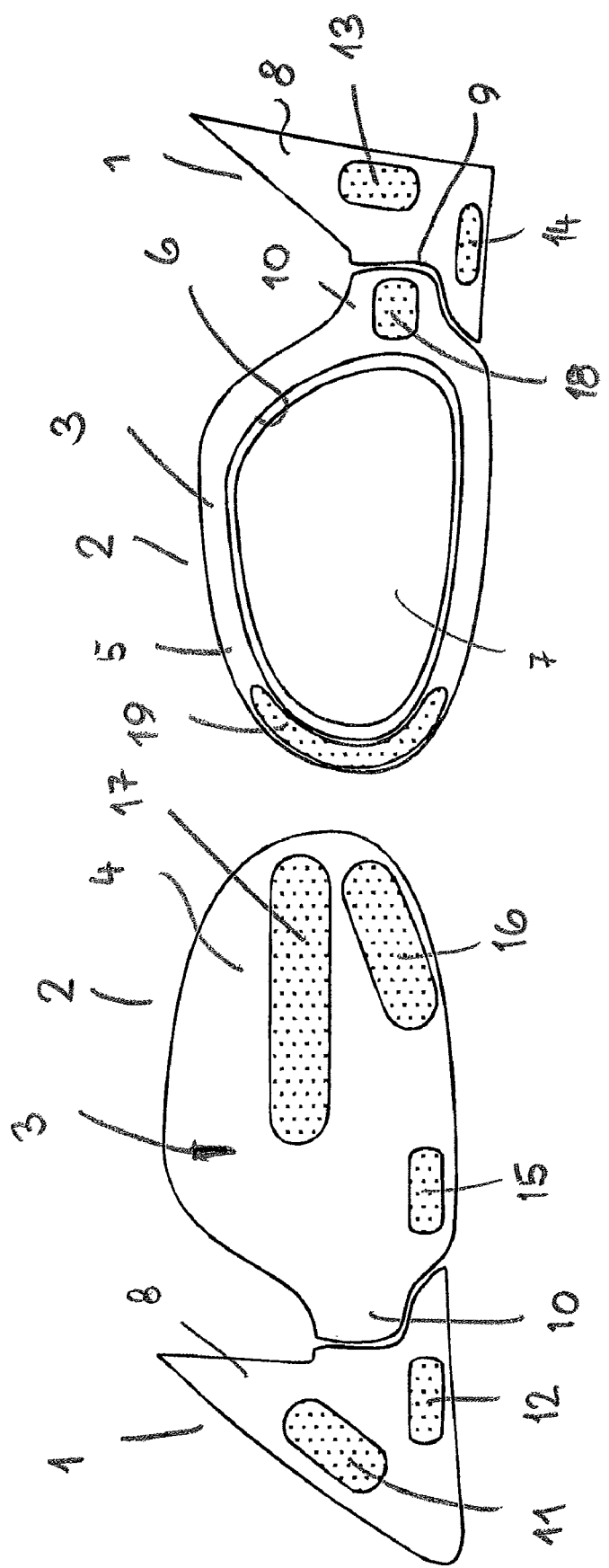

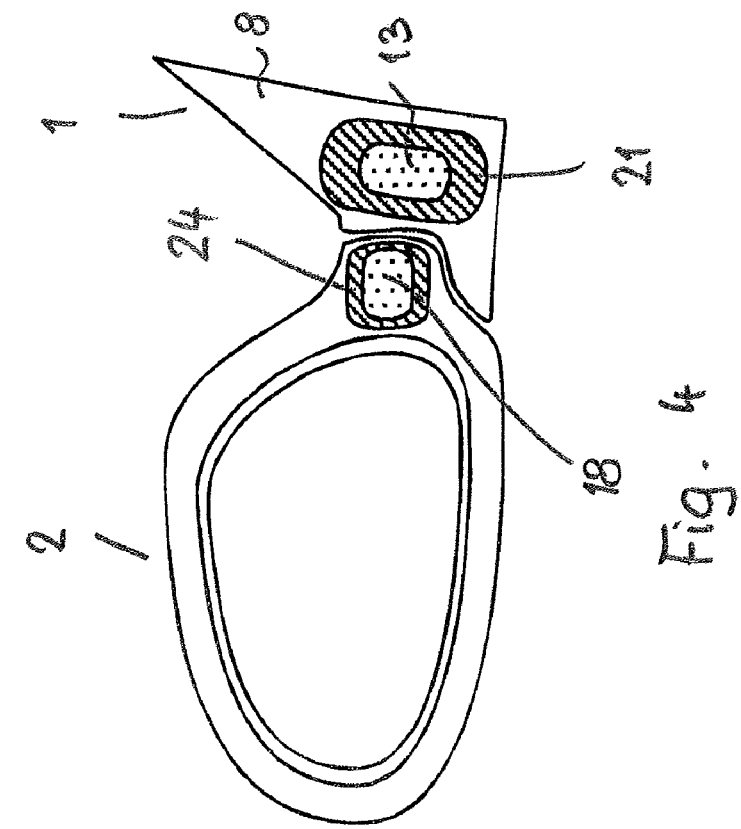
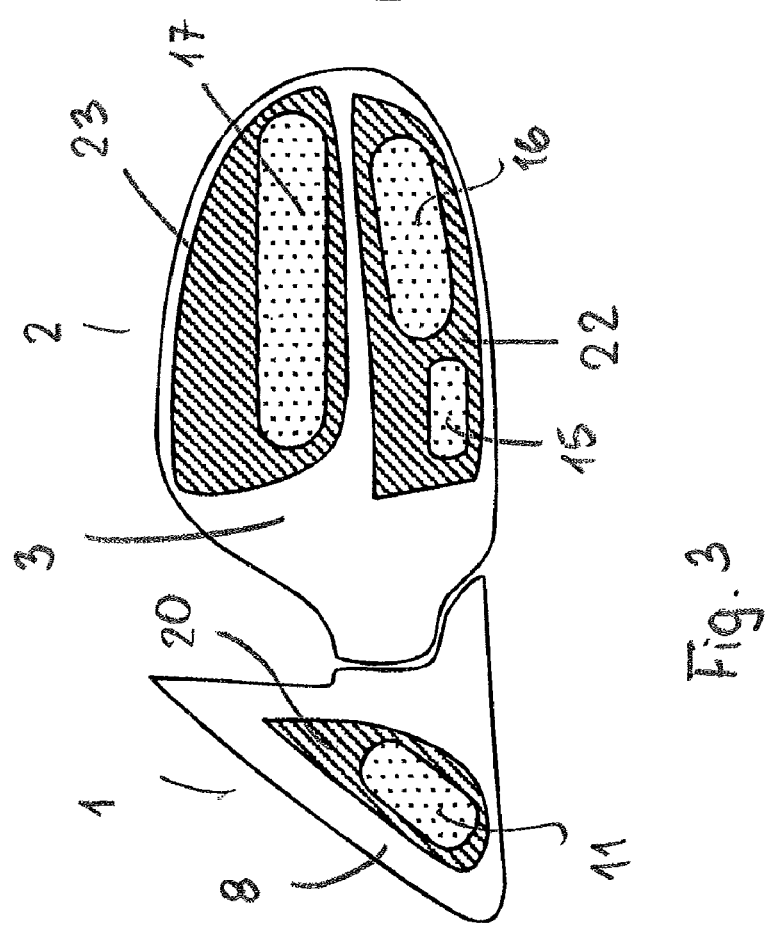

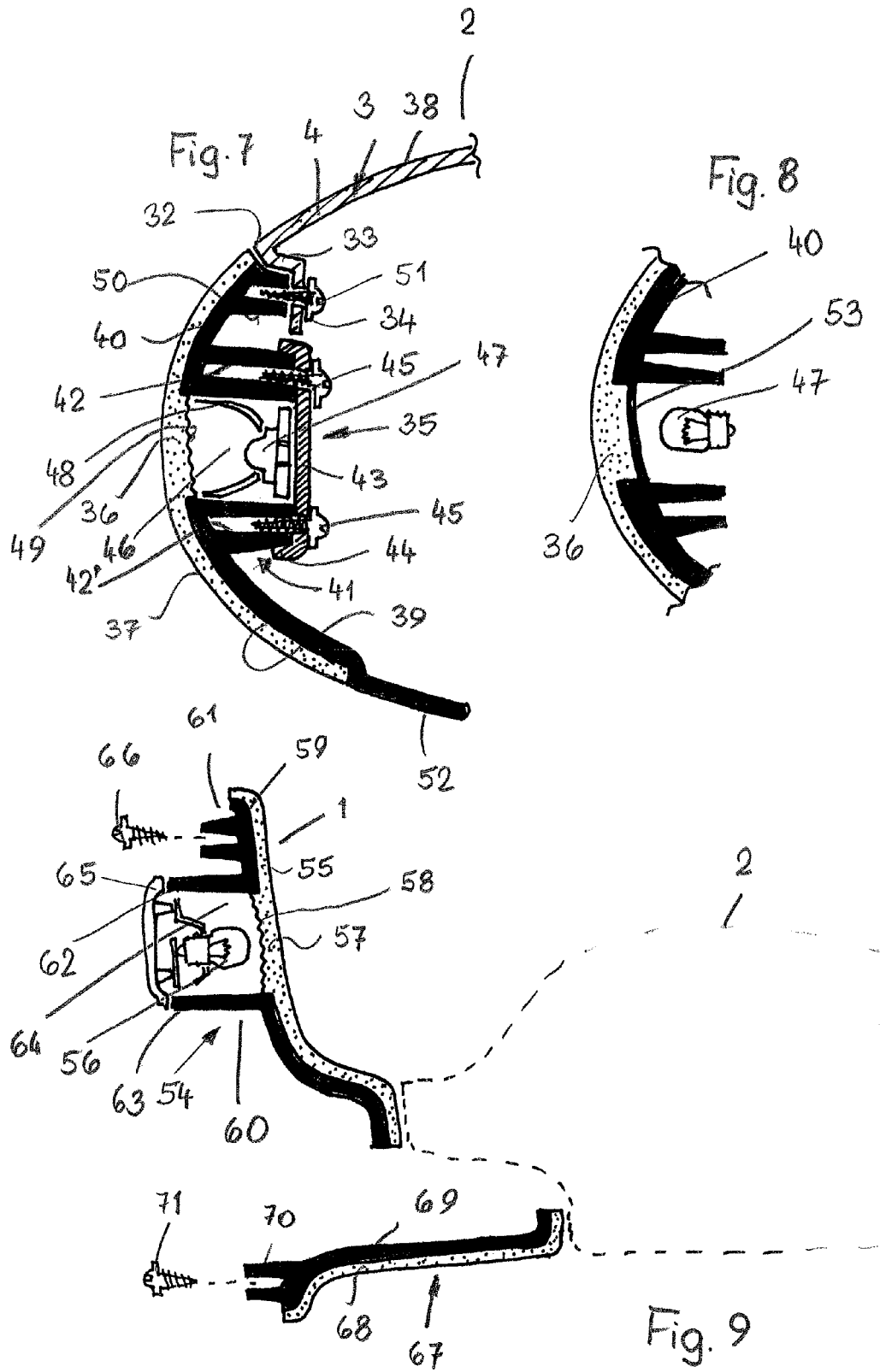

EXTERIOR REARVIEW MIRROR FOR VEHICLES, PREFERABLY FOR MOTOR VEHICLES

The invention is based on the German application 102006048323.5 which is herein incorporated by reference.

The invention relates to an exterior rearview mirror for vehicles, preferably for motor vehicles, with a mirror head, which is provided with a mirror glass, and in which at least one illuminant is disposed, radiating light to the outside, through at least one light permeable section and preferably provided with a mirror base.

PRIOR ART

It is known to dispose illuminants in the head of the mirror, possibly also in the base of the mirror, whose light radiates to the exterior through light window. The light window is generally made from transparent plastic, which can possibly also be colored.

It is the object of the invention to provide an exterior rearview mirror of this kind, so that the light function can be performed in an optimum manner with a simple design of the exterior rearview mirror.

This object is accomplished in the exterior rearview mirror of this kind according to the invention by at least a part of the housing of the mirror head and/or of the housing of the mirror base is comprised of at least two plastic layers, having different light permeability, and the plastic layer with the lower light permeability is missing in the light permeable section, or it only has such thickness, that the light radiated by the illuminant radiates to the outside with sufficient light intensity.

In the exterior rearview mirror according to the invention at least a part of the housing of the head of the mirror and/or of the housing of the base of the mirror is made from at least two layers of plastic with different light permeability. In the light permeable section only the plastic layer with higher light permeability is provided, or the plastic layer with lower light permeability only has such a thickness that the light radiated by the illuminant can exit with a sufficient light intensity. The plastic layer with higher light permeability can be used as a light pane for the illuminant located behind it. The plastic layer with lower light permeability can be used, for example, to give a proper color to the transparent section. In case there is only the plastic layer with high light permeability provided in the light pass-through section, a less powerful illuminant can be used to reach the respective light intensity. In case both plastic layers are provided in the section of the light exit surface, the plastic layer with lower light permeability is so thin that the light radiated by the illuminant can pass through both plastic layers to the exterior in a sufficient manner. Furthermore, the second plastic layer with lower light permeability in this light pass-through section can be provided, so that it covers the illuminant towards the exterior.

It is advantageous in particular, when the plastic layer with lower light permeability is provided with structures, preferably formed integrally with said structures. These structures can e.g. be holders/mounting elements or walls, defining a receiving space for the illuminant. Since the structures are preferably provided integrally with the plastic layer of lower light permeability, they do not have to be provided separately and mounted.

In order to accomplish an optimum connection of both plastic layers, they are preferably connected amongst each other through injection molding. With this injection molding process, the structures can also be molded simultaneously.

Furthermore, it is possible to provide for example optical structures at the plastic layer with the higher light permeability.

Further features of the invention can be derived from the other patent claims, the description and the drawings.

SHORT DESCRIPTION OF THE DRAWINGS

The invention is described in detail with reference to a few embodiments illustrated in the drawings, showing in:

FIG. 1 and

FIG. 2 a rearview mirror according to the invention in front- and rearview;

FIG. 3 and

FIG. 4 a second embodiment of an exterior rearview mirror according to the invention in illustrations according to FIGS. 1 and 2;

FIG. 5 and

Figure 6:
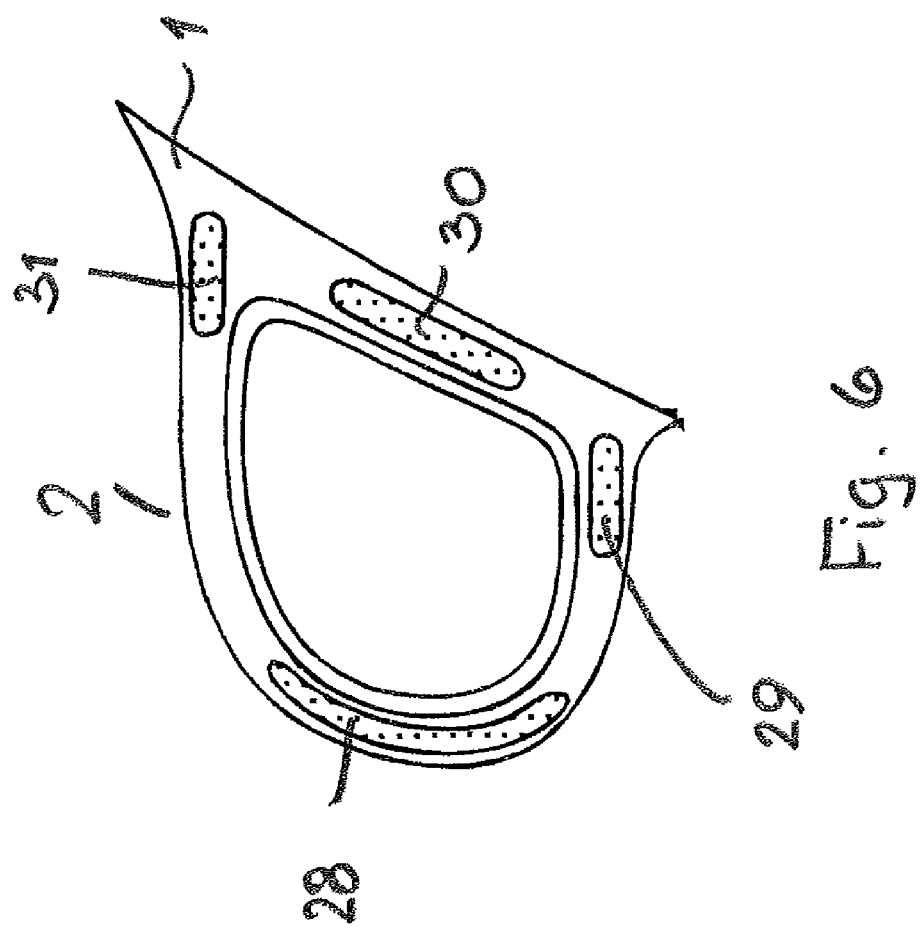

FIG. 6 a third embodiment of a rearview mirror according to the invention in illustrations according to FIGS. 1 and 2;

FIG. 7 a sectional view through a housing of a mirror head of the exterior rearview mirror according to the invention;

FIG. 8 another embodiment of a housing of the mirror head of an exterior rearview mirror according to the invention in an illustration according to FIG. 7; and FIG. 9 a sectional view of a mirror base of an exterior rearview mirror according to the invention.

FIGS. 1 and 2 show a rearview mirror with a mirror base 1 and a mirror head 2. The exterior rearview mirror is mounted to the motor vehicle through the mirror base 1 in a known manner. The mirror head 2 can be folded relative to the mirror base 1 in and against driving direction. Herein, the mirror head 2 can be pivotable around an axis in both folding directions (one axis mirror).

However, it is also possible, that the mirror head 2 pivots around a different axis, when folding forward in driving direction, then when folding backwards in driving direction (two axis mirror). Furthermore, the mirror head 2 can also additionally be pivoted into a parking position in an advantageous manner, in which it abuts against the side of the motor vehicle.

The mirror head 2 has a housing 3 with an advantageously convex rearview wall 4, and a circumferential side wall 5. It defines an opening 6, in which a mirror glass 7 is located. It can be adjusted by a motor in an advantageous manner. For this purpose a respective motor drive is disposed in the housing 3. The mirror glass 7 sits on a mirror glass carrier, which is not shown, which can be pivoted into the desired direction through the drive. The mirror glass 7 can be provided as EC glass in an advantageous manner.

In the housing 3 additional components, like sensors for dimming the EC mirror glass, speakers, cameras, illuminants, and similar can be housed.

The mirror base 1 has a housing 8, which has a receiving space 9 at its side facing towards the mirror head 2, into which the mirror head housing 3 protrudes with a respective protrusion 10. The circumferential shape of the housing protrusion 10 is adapted to the circumferential shape of the receiving cavity 9, so that a continuous transition in this section between the mirror base 1 and the mirror head 2 is accomplished.

The housing 8 of the mirror base 1 is provided with transparent sections 11 through 14 at its front- and backside in the embodiment, behind said transparent sections light sources are disposed, whose light beams can transit through the transparent sections to the exterior. The other sections of the housing 8 are provided with a completely, or partially two-layered construction, which will be described in more detail with reference to FIGS. 7 through 9.

Also, the housing 3 of the mirror head 2 is provided with transparent sections 15 to 19 at its front and backside, behind which also light sources are disposed, whose light passes to the exterior through sections 15 through 19. The other sections of the housing 3 can also have a complete or partial two-layer construction.

The shape and/or the disposition of the transparent sections 11 through 14, 15 through 19, depend on the application purpose of the illuminants. Thus e.g. the transparent section 17 can be part of a repeat signal light. The transparent sections can also be part of surrounding area lights, by which the section around the vehicle, in particular the floor section, can be illuminated. The size of the transparent sections 11 through 14, 15 through 19, also depends on the desired application. Also, the light intensity of the illuminants, associated with the transparent sections, can be adapted to the respective application.

FIGS. 3 and 4 show an exterior rearview mirror with a mirror base 1 and a mirror head 2. The housing 8 of the mirror base 1 is provided with the transparent sections 11 and 13 at its front and backside. Furthermore, the mirror base housing 8 is provided with a respective transparent section 20, 21 at its front- and backside, surrounding the transparent sections 11 and 13. These sections are a part of housing components within the mirror base, which will be described in detail.

The housing 3 of the mirror head 2 is also provided with such transparent sections 22, 23, and 24 at its front and backside. These are also parts of housing components, which are located within the mirror head housing 3. The transparent section 22 surrounds the two transparent sections 15 and 16, the section 23 surrounds the transparent section 17, and the section 24 surrounds the transparent section 18. The circumferential shape and the size of the transparent section 20, 21 and 22 through 24 are determined by the respective application.

Figure 5:
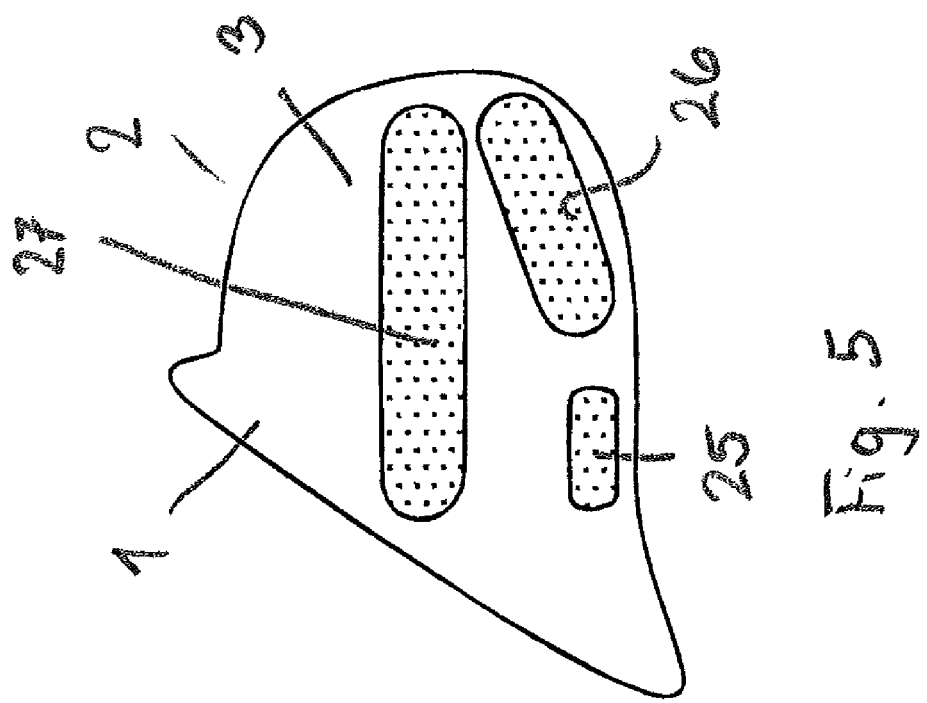

FIGS. 5 and 6 shows, that such transparent sections can also be provided at one piece exterior rearview mirrors, which have no folding mirror head. The exterior rearview mirror according to FIGS. 5 and 6 has a mirror head 2, which is provided integrally with the mirror base 1. The housing 3 of the mirror head 2 is provided at its front and backside with transparent sections 25 through 31, behind which light sources are disposed in a manner that still is to be described, wherein said light sources radiate their light through these sections to the exterior.

The transparent sections 11 through 31, shown in FIGS. 1 through 6, are only to be perceived as examples. These sections can be provided distributed in a very different manner at the mirror base 1 and/or at the mirror head 2, wherein the size, circumferential shape, and extension can be adapted to the application of the respective exterior rearview mirror in a simple manner. FIG. 7 shows the rear wall 4 of the mirror head housing 3. The rear wall 4 has an opening 32, whose rim 33 is facing inward. The free end of the rim 34 is angled and serves for mounting a light unit 35, which is inserted into the opening 32 of the rear wall 4. The light unit 35 has a transparent pane 36, forming a continuous extension of the exterior 38 of the housing 3, in the installed position of the light unit 35 with its exterior 37. The pane 36 is made from colorless, or also from colored plastic, preferably injection moldable plastic. On its rear, or interior side 39, a second layer 40 is applied, preferably molded. This layer 40 can be transparent and toned, but also opaque. The layer 40 is part of a holder/mounting element 41, which is provided integral with the layer 40. The element 41 has walls 42, 42', disposed in parallel to each other, protruding to the inside from the layer 40, wherein a cover 43 is placed on said walls. Said cover has a circumferential rim 44, protruding towards the layer 40, by which it surrounds the walls 42, 42'. The cover 43 is held by bolts 45, which are bolted into the walls 42, 42' on the front side.

The walls 42, 42' define a receiving section 46 for at least one illuminant 47, preferably an LED. Depending on the shape of the receiving space 46, several illuminants 47 can be provided. They can be disposed in a different distribution, depending on the circumferential shape of the receiving cavity 46. The light emitted by the LEDs 47 radiates between the walls 42, 42' through the pane 36 to the exterior.

In the embodiment a reflector 48 is associated with the illuminant 47, which increases the light yield, reflecting the beams, originating from the illuminant 47 in a transversal manner, in a direction towards the light pane 36. Depending on the illumination requirements the reflector 48 can also be left away.

It is also possible, like e.g. illustrated in FIG. 7, to provide an optical system 49 at the interior side of the pane 36 in the light exit section, wherein said optical system is preferably provided integrally with the pane 36. The optical system 49 can be provided so that it redirects light, scatters light, or operates as a light conductor.

The layer 40 is provided integrally with a holder/mounting element 50, which protrudes transversally from the layer 40 towards the inside, and into which bolts 51 are threaded, with which the entire light unit 35 is mounted at the free end 34 of the rim 33 of the housing 4.

The pane 36 is made from transparent, preferably colorless plastic. The layer disposed on its backside 40 is made e.g. from opaque plastic. The layer 40 covers the backside of the layer 36 in its entirety, beside the section of the optical system 49. Thus only the center section of the pane 36 is translucent, so that the light emitted by the illuminant 47 can pass to the exterior.

The layer 40 is provided, so that it reaches beyond the light pane 36 at least along a rim. In this case, the layer 40 is pulled so far towards the exterior that its exterior 52 forms a continuous extension of the exterior 37 of the light pane 36. At this overreaching part of the layer 40, at least one additional (not shown) holder/mounting element can be provided, in order to be able to mount the light unit 35 also in this section at the rim 33 of the opening 32.

The light pane 36 forms the transparent sections 15 through 19 and 25 through 31 with its translucent section, wherein said sections are shown in FIGS. 1 through 4 in an exemplary manner. The part of the layer 40 protruding beyond the light pane 36 forms the sections 22 through 24, illustrated in FIGS. 3 and 4. In the embodiment the layer 40 has approximately the same thickness as the layer forming the light pane 36. The inner layer 40 has a lower degree of transmission, than the outer layer 36. In the section of the illuminant 47, the more transparent pane 36 serves as a light pane for the illuminant 47, located behind it, wherein the inner layer 40 mostly serves the purpose to give the light pane 36 a color tone of its own. The layer 40 is interrupted in the section of the illuminant 47, so that the light emitted by the illuminant can reach to the exterior in an optimum manner.

In case the outer layer 36 is transparent and colorless, toning the layer 40 can give a desired color tone to the transparent section. At the inner layer 40 structures are formed in the manner described in an exemplary manner, which serve for receiving the illuminants, electrical components, or cover caps for connecting with other components, like mirror adjustment drives or cables.

The outer layer 36 can also cover larger sections, or even the complete upper side of the housing 4. Thus, this layer 36 can be colorless, or also toned. The layer 36 and the layer 40 can form the housing 3 of the mirror head 2 in an advantageous manner. Then, the layer 40 is only provided in the sections, in which the light irradiated by the illuminant is to pass to the exterior. In these sections the layer 40 can also be so thin that the irradiated light can pass through both layers 36, 40 with sufficient brightness.

Also, the transparent sections 11 through 13 of the mirror base 1 are provided in a similar manner.

In the embodiment according to FIG. 8 the section of the light pane 36, through which the light emitted by the illuminant 37 passes to the exterior, is covered on the inside only by a very thin section 53 of the layer 40. The coating 53 is so thin that the light emitted by the illuminant 47 can pass to the exterior with the required light intensity. Furthermore, the layer 40 can be formed identical and provided, like in the embodiment according to FIG. 7. In this embodiment, no reflector is associated with the illuminant 47.

Furthermore, the illuminant 47 is a glow bulb. It can be certainly also a LED according to the previous embodiment.

FIG. 9 shows the disposition of the transparent sections in the mirror base 1 in an exemplary manner. The housing 8 of the mirror base 1 (FIGS. 1 and 2), which is not shown in FIG. 9, has an opening, into which a light unit 54 is inserted. It has an outer layer 55, forming a light disc of the light unit 54. Behind it, at least one illuminant 56 is disposed, which can be a LED, a glow bulb, and similar. Depending on the size of the transparent section, further illuminants can be provided behind the light pane 55. In the light pass-through section 57, the light pane 55 is provided with an optical system 58 on the inside, which can serve for light diversion, light scattering, or as a light conductor. Preferably, the optical system 58 is formed by a respective structure of the inside of the light pass-through section 57. The optical system 58 can be fabricated into the inside of the light disc, like the optical system 49 (FIG. 7) during the injection molding process. The light disc 55 is covered by an interior layer 59 in the section outside of the light pass-through section 57, wherein said layer is molded onto the inside of the light disc 55 through an injection molding process. Besides the light pass-through section 57, the layer 59 completely covers the inside of the light pane 55.

Structures 60, 61 are molded to the layer 59. The structure 60 has two walls 62, 63, protruding transversally from the layer 50 towards the inside, and defining a receiving space for the illuminant 56. A cover 65 can be placed onto the front side of the walls 62, 63, and can be mounted in a suitable manner, so that it covers the receiving space 64.

The structure 61 serves for mounting the light unit 54 at the housing 8 of the mirror base 1. The light unit 54 is mounted to the housing 8 of the mirror base 1 through bolts 66 through the structure 61.

In the embodiment, the light pane 55 and the layer 59 advantageously have approximately the same thickness. Both layers can certainly also have different thicknesses. The light pane 55 is preferably transparent at least in the light pass-through section 57, and preferably provided colorless. Like the light pane 36, according FIGS. 7 and 8, the light pane 55 can also be toned, when the light source is to perform a respective function, like e.g. a signal light function. The layer 59 can be provided transparent, but also opaque. In case the outer layer 55 is transparent and opaque, a certain color tone can be provided through coloring the interior layer 59 of the light unit 54.

The mirror base 1 is provided with an additional functional element 67, which is inserted into an opening of the housing 8 of the mirror base 1, and mounted there. The functional element 67 has the outer layer 68, which is covered by a layer 69 on the inside. The inner layer 69 is provided integral with a structure 70, which serves as a holder/mounting element, and into which the bolts 71 are bolted, through which the functional element 67 can be mounted in the opening of the housing 8. The layer 69 completely covers the outer layer 68 on the inside. The outer layer 68 can be comprised of transparent plastic, which can be colorless or toned. The inner layer 69 can also be light permeable and colorless, or toned.

The outer layer 55, 68 has a higher degree of light transmission than the inner layer 59, 69. The layer 55, 68 with the higher degree of transmission can cover also larger sections, or even the complete surface of the housing 8 of the mirror base 1. As described based on the embodiment according to FIG. 7, the entire housing can be comprised of two layers 55, 59; 68, 69 in an advantageous manner. In the light passthrough sections only the layer 55, 68 with the higher transparency is present, or the less transparent layer 59, 69 is very thin in these sections, so that it practically does not influence the light passage.

The design of the layers 36, 40; 55, 59; 68, 69 is only shown in an exemplary manner. The two layers, which are connected among each other through injection molding, each form a body with a stable shape, which can be applied accordingly to the exterior rearview mirror in a simple manner. The design of the shape depends on the particular construction of the exterior rearview mirror.

The transparent sections 11 through 31 can be comprised of two layers, as described with reference to FIGS. 7 through 9 in an exemplary manner. It is possible in principle to provide additional layers. While in FIGS. 1 through 6, only particular sections 11 through 31 are provided with this layer buildup, preferably the entire housing 3, 8 can have the multilayer construction. This multilayer construction allows the integration of the light function into the exterior rearview mirror without any gaps. These light functions can e.g. be a signal light, a ground light, a warning light, a position light, a front light, and similar. For the integrated light functions no additional light panes will be necessary. In particular, also gaps can be avoided, in particular, when the entire housing has the at least two-layer construction. The exterior rearview mirror only has a small number of components, and can be mounted in a simple manner, due to the described layout. Also, the effort to seal the integrated light sources in the exterior rearview mirror can be kept small.

As has been explained with reference to FIG. 8 in an exemplary manner, the light pass-through section can be provided on the inside with a thin layer. Then it also possible, to provide the light pass-through section, invisible from the outside, through respective toning of this inner coating of the light pass through section, when the light source is not turned on. When the illuminant is turned on, sufficient light passes to the outside through this thin coating, so that the legal requirements with respect to the light intensity are fulfilled. The exterior layer can be used as a transparent cover for the housing 3, 8 when it is made from transparent plastic. Such a coating produces a high gloss effect, so that an expensive lacquering of this high gloss effect can be dispensed with.

The components are produced through injection molding, in particular through multicolor injection molding. Initially, the first layer of the component to be manufactured is molded in the injection mold. Before this first layer is hardened, the second layer is molded on. This can be performed in another injection molding tool, or also in the same injection molding tool, in which only another mold component is inserted. Since such multicolor injection molding methods are known, they are not described in more detail. With this injection molding method also the entire housing 3, 8 of the mirror head 2 and/or of the mirror base 1 can be produced, when it is comprised of said two layers.

What is claimed is:

1. An exterior mirror for vehicles comprising:
   a mirror base having a base housing;
   a mirror head secured to said mirror base, said mirror head having a mirror head housing defining a mirror glass opening and an illumination opening;
   an illuminant disposed adjacent said illumination opening emitting light toward said illumination opening; and
   a transparent section fixedly secured to said mirror head housing, wherein said transparent section includes a lens portion covering said illumination opening and a circumscribing section extending radially out past said lens portion and overlapping said mirror head housing such that the light emitted by said illuminant is transmitted out through said transparent section.

2. An exterior mirror as set forth in claim 1 wherein said mirror head housing including a layer (40) for mounting said illuminant to said mirror head.

3. An exterior mirror as set forth in claim 2 wherein said circumscribing section defines a circumscribing area and said lens portion defines a lens area such that said circumscribing area is greater than said lens area.

4. An exterior mirror as set forth in claim 3 wherein said transparent section extends through a curved plane defined by said mirror head housing.

5. An exterior rearview mirror according to claim 3, wherein said circumscribing area and said layer (40) are connected amongst each other through injection molding.

6. An exterior rearview mirror according to claim 5 wherein said layer (40) includes structures to mount said layer (40) to said mirror housing.

7. An exterior rearview mirror according to claim 6, wherein the structures are provided integrally with said layer (40).

8. An exterior rearview mirror according to claim 7, wherein the structures receive the illuminant.

9. An exterior mirror as set forth in claim 8 wherein said illuminant is secured to said structures.

* * * * *